US009984665B2

(12) United States Patent
Rønnow

(10) Patent No.: US 9,984,665 B2
(45) Date of Patent: May 29, 2018

(54) ELECTRICALLY AMPLIFIED STRINGED INSTRUMENT

(71) Applicant: Nordic Guitars, Skanderborg (DK)

(72) Inventor: Bjørn Egelund Rønnow, Skanderborg (DK)

(73) Assignee: NORDIC GUITARS, Skanderborg (DK)

( * ) Notice: Subject to any disclaimer, the term of this patent is extended or adjusted under 35 U.S.C. 154(b) by 0 days. days.

(21) Appl. No.: 15/554,115

(22) PCT Filed: Jun. 26, 2016

(86) PCT No.: PCT/DK2016/050055
§ 371 (c)(1),
(2) Date: Aug. 28, 2017

(87) PCT Pub. No.: WO2016/134729
PCT Pub. Date: Sep. 1, 2016

(65) Prior Publication Data
US 2018/0040309 A1 Feb. 8, 2018

(30) Foreign Application Priority Data
Feb. 27, 2015 (DK) ................................ 2015 70112

(51) Int. Cl.
*G01D 1/08* (2006.01)
*G10D 1/08* (2006.01)
(Continued)

(52) U.S. Cl.
CPC ............... *G10D 1/085* (2013.01); *G10D 3/06* (2013.01); *G10H 3/03* (2013.01)

(58) Field of Classification Search
CPC ..................................................... G10D 1/085
See application file for complete search history.

(56) References Cited

U.S. PATENT DOCUMENTS 1,183,369 A 5/1916 Gardie
1,554,806 A * 9/1925 Furia ........................ G10D 1/10 84/263
(Continued)

FOREIGN PATENT DOCUMENTS

DE 9141 C 7/1879

OTHER PUBLICATIONS

International Search Report for corresponding application PCT/DK2016/050055 filed Feb. 26, 2016; dated May 4, 2016.

*Primary Examiner* — Robert W Horn
(74) *Attorney, Agent, or Firm* — Cantor Colburn LLP

(57) ABSTRACT

An electrically amplified stringed instrument including an elongated stringed arrangement including a first end and a second end having a first string device including a first set of strings extending between the first end and the second end of the stringed arrangement and a second string device including a second set of strings extending between the first end and the second end of the stringed arrangement, where the first string device and the second string device are arranged substantially side by side so that a cross section of at least some of the strings of the first set of strings increases towards the second string device and so that a cross section of at least some of the strings of the second set of strings increases towards the first string device, the first string device including at least one first amplifying means arranged at the first end of the elongated stringed arrangement and the second string device including at least one second amplifying means arranged at the second end of the elongated stringed arrangement, where the stringed arrangement is mounted on a body and connected to the body through a pivotal joint.

20 Claims, 3 Drawing Sheets

(51) Int. Cl.
*G10H 3/03* (2006.01)
*G10D 3/06* (2006.01)

(56) References Cited

U.S. PATENT DOCUMENTS

| | | | | | |
|---|---|---|---|---|---|
| 3,636,809 | A * | 1/1972 | Ezaki | G10D 1/08 | 84/263 |
| 4,343,217 | A * | 8/1982 | Brody | G10G 5/005 | 84/263 |
| 4,377,101 | A | 3/1983 | Santucci | | |
| 4,953,434 | A * | 9/1990 | Guss | G10D 1/00 | 84/173 |
| 4,981,063 | A * | 1/1991 | Roberts | G10D 1/085 | 84/267 |
| 5,293,804 | A * | 3/1994 | Myers | G10D 1/085 | 84/291 |
| 5,315,910 | A * | 5/1994 | Soupios | G10D 1/085 | 84/263 |
| 5,442,986 | A * | 8/1995 | Cota | G10D 1/085 | 84/267 |
| 6,649,818 | B2 * | 11/2003 | Bailey | G10D 1/00 | 84/293 |
| 7,102,073 | B1 * | 9/2006 | Isola | G10D 1/08 | 84/263 |
| 8,273,974 | B1 * | 9/2012 | Gonzalez | G10D 1/085 | 84/267 |
| 9,721,542 | B2 * | 8/2017 | Sperr | G10D 1/085 | |
| 2003/0188622 | A1 * | 10/2003 | Wilson | G10D 1/00 | 84/267 |
| 2005/0247183 | A1 | 11/2005 | Towers | | |
| 2008/0210077 | A1 | 9/2008 | Boxberger | | |
| 2010/0199829 | A1 | 8/2010 | Kamensky | | |
| 2010/0288109 | A1 * | 11/2010 | Van Kelst | G10D 1/085 | 84/726 |

* cited by examiner

ELECTRICALLY AMPLIFIED STRINGED INSTRUMENT

TECHNICAL FIELD

The invention relates to an electrically amplified stringed instrument comprising an elongated stringed arrangement including a first end and a second end.

BACKGROUND

Different kinds of stringed guitar instruments are known in the art, however there is always a demand for stringed instruments enabling new musical expressional methods or stringed instruments enabling that a single person can create new sounds or more complex music.

From U.S. Pat. No. 4,343,217 it is known to form a stringed instrument by means of two stringed devices extending in opposite directions from the same body. The stringed instrument is connected to the musician through a pivotal joint enabling that the musician easily may rotate the stringed instrument to optionally play either of the stringed devices. However only one stringed device may be played at a time and the instrument is very space consuming.

Thus, from U.S. Pat. No. 4,377,101 it is known form a bass and a guitar on the same neck and body enabling that the two instruments may be played at the same time, in that the guitar strings and the bass strings are arranged in the normal order with the thinnest string at the bottom and the thickness of the strings increasing upwards. However the expressional methods are still quite limited.

BRIEF SUMMARY

The invention provides for an electrically amplified stringed instrument comprising an elongated stringed arrangement including a first end and a second end. The stringed arrangement further comprises a first string device including a first set of strings extending between the first end and the second end of the stringed arrangement and a second string device including a second set of strings extending between the first end and the second end of the stringed arrangement. The first string device and the second string device are arranged substantially side by side so that a cross section of at least some of the strings of the first set of strings increases towards the second string device and so that a cross section of at least some of the strings of the second set of strings increases towards the first string device. The first string device comprises at least one first amplifying means arranged at the first end of the elongated string arrangement and the second string device comprises at least one second amplifying means arranged at the second end of the elongated string arrangement.

Arranging the amplifying means on different stringed devices at opposite ends of the stringed arrangement enables that the various possible playing styles using one or both of the stringed devices are also available when the stringed arrangement is rotated so that the ends swap position. For example a playing style of selecting tones on one stringed device with one hand and striking, plucking or tapping strings of both stringed devices with the other hand works also when the stringed arrangement is rotated, just with the one hand now selecting notes on the other stringed device, and the other hand striking, plucking or tapping strings of both stringed devices. However, this would only be practical if the generated sound is electrically amplified in that a stringed instrument comprising soundboxes at both ends of the stringed arrangement would be difficult to play and expensive to manufacture.

Arranging the amplifying means at opposite ends of the stringed arrangement also enables that the two stringed devices may have different designs visually and/or musically, and that the stringed instrument may be played in at least two different ways depending of which end of the instrument is played and/or how the instrument is orientated. Hereby it is possible to generate a big variety of musical expressional methods on the same stringed instrument.

On a normal traditional stringed instrument—such as a guitar—the cross section of at least some of the strings increases upwards so that lighter notes are played on the lower strings and the deeper notes are played on the upper strings. Thus, forming the string devices so that the cross section of at least some of the strings of the first set of strings increases towards the second string device and so that a cross section of at least some of the strings of the second set of strings increases towards the first string device is advantageous in that the lower of the two string devices always can be played as a normal guitar, bass, etc., no matter which of the two string devices is the lowest—i.e. no matter how the stringed arrangement is orientated. Only if the user e.g. would use a thumb to tap the upper string device while playing traditionally with the other four fingers on the lower string device, or use both hands for tapping on both string devices simultaneously, etc., the user would have to learn a new playing style—but this would be the case no matter what since it is not common to play two different string devices simultaneously.

In this context the term “amplifying means” should be understood as any kind of amplifying device or at least a part of an amplifying device such as any kind of pickup, e.g. single coil, humbucker, piezo, etc., microphone, transducer or other devices suitable for generating an electrical signal in accordance with vibrations of the strings of a stringed instrument. The electrical signal of each amplifying means, e.g. pickup, may preferably be made available separately, e.g. as different channels in a stereo jack, for individual audio processing and amplification. In an aspect several microphones or pickups are provided, e.g. one for each string for each group of a few strings, and the electrical signals may be routed separately or accumulated with either channel of choice, thereby making it possibly to redefine which strings’ vibrations appear in which output channel of e.g. two channels.

In an aspect of the invention, the stringed arrangement is mounted on a body.

Hereby is achieved an advantageous embodiment of the invention.

In an aspect of the invention, the stringed arrangement is connected to the body through a pivotal joint.

Connecting the stringed arrangement to the body through a pivotal joint enables the stringed arrangement to be rotated while the body is held in a fixed position relative to the musician. This enables that the musician easily can change which end of the stringed arrangement to play normal without having to rotate the entire stringed instrument.

In an aspect of the invention, the pivotal joint is arranged substantially in the middle between the first end and the second end of the elongated stringed arrangement.

Arranging the pivotal joint substantially in the middle of the stringed arrangement enables that the shape of the stringed instrument is substantially identical no matter if the first end or second end of the stringed arrangement is arranged at the body. This makes the stringed instrument easier to play as playing the first end and second end of the stringed arrangement can be done in a similar way simply by rotating the stringed arrangement relative to the body.

In an aspect of the invention, the body is elongated substantially in the direction of the first set of strings and the second set of strings during use of the stringed instrument and wherein the body comprises a first strap fastening means arranged at a first body end of the elongated body and a second strap fastening means arranged at a second body end of the elongated body.

Arranging the strap fastening means at the first body end and the second body end of the elongated body enables that the body more easily can be centred in front of the musician and the orientation of the body more easily can be controlled so that the stringed instrument can be positioned in a more natural playing position in relation to the musician.

In this context the term "use of the stringed instrument" should be understood as when using the stringed instrument to generate music by striking, plucking or tapping one or more strings with one hand—either directly or with striking means such as a plectrum—while selecting tones by pressing down on one or more of the strings, or tapping strings, with the other hand.

In an aspect of the invention, the first amplifying means and the second amplifying means are arranged to generate an electrical signal in accordance with vibrations of the first set of strings and the second set of strings respectively, wherein the pivotal joint comprises conducting means for conducting the electrical signals through the pivotal joint.

Conducting the electrical signals from amplifying means through the pivotal joint enables that the electrical signals from both string devices can easily be conducted to a fixed plug typically positioned on the body instead of having cables hanging out from both amplifying means.

In an aspect of the invention, said first string device and/or second string device comprise frets.

Hereby is achieved an advantageous embodiment of the invention.

In an aspect of the invention, only the first string device or the second string device comprise frets.

Arranging combinations of fretted and not fretted string devices can provide the musician with a greater variation of tones and thereby enabling increased possibilities for musical expressions. In an aspect of the invention, one or both of the string devices comprises only partial fretting to even further increase the usability of the instrument for certain playing styles.

In an aspect of the invention, the stringed instrument comprises fixation means for fixating the body and the elongated stringed arrangement in relation to mutual rotation during use of the stringed instrument.

Applying fixations means for fixating the body and the elongated stringed instrument against mutual rotation increases the stability of the stringed instrument which makes it easier to play.

In an aspect of the invention, the fixation means comprise a ball plunger.

Applying a ball plunger as means for fixation is a simple and cost efficient way of fixating the body and the elongated stringed instrument against mutual rotation.

In an aspect of the invention, the first string device and the second string device are arranged to extend substantially in the same plane.

Arranging the first and the second string device substantially in the same plane enables easier access to both string devices at the same time with the same hand.

A string device according to the present invention will typically comprise an elongated board which in each end is provided with means for fixating the strings so that the string extends over a front surface of the board. In embodiments this front surface could be provided with frets.

Therefore, in this context the term "substantially in the same plane" should be understood as the front surfaces being aligned in the same plane or the first set of strings and the second set of strings being substantially aligned in the same plane.

However it should be understood that the means for fixating the strings in either ends of the string devices might not have similar height which will entail that the strings of the first string device and the second string device may be slightly sloping in opposite directions. As most musicians find it easier to perform tapping in the area with least distance between the strings and the board, an embodiment of the invention with oppositely sloping strings is highly advantageous as it improves the usability of the playing style where the musician is supposed to use one hand to both strike or pluck strings of one of the string devices in the pickup area, and at the same time use the thumb of the same hand to tap strings on the other string device.

In an aspect of the invention, free space is provided between the first string device and the second string device.

Providing free space between the first and the second string device reduces the risk of vibrations transmitting from one string device to the other. Furthermore, when playing e.g. a guitar the hand playing the neck of the guitar usually is placed beneath the neck so that the fingers extend upwards towards the strings. However, occasionally and/or in certain musical styles, musicians use the thumb of that same hand to press or tap a string from the opposite side of the neck. Therefore forming a free space between the string devices also enables this playing style.

In an aspect a groove or slide bar or the like is provided longitudinally between the first and the second string device or on one or both sides of the stringed arrangement, for mounting a capo with matching fastening means so that it can slide along the stringed device and engage the strings at a user-defined position. This is advantageous, as a normal capo for strapping around a guitar neck is not suitable for at least some embodiments of the invention.

BRIEF DESCRIPTION OF THE DRAWINGS

The invention will be described in the following with reference to the figures in which.

DETAILED DESCRIPTION

Figure 1:
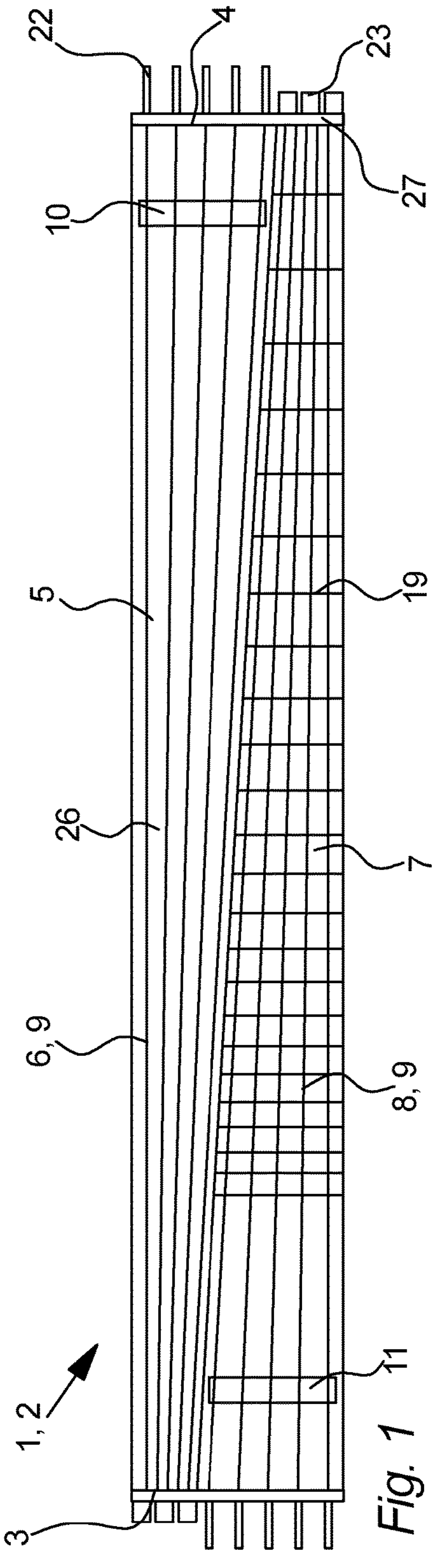
FIG. 1 illustrates a elongated stringed arrangement with the two string devices arranged side by side, as seen from the front.

FIG. 1 illustrates an elongated stringed arrangement 2 with the two string devices 5, 7 arranged side by side, as seen from the front.

In this embodiment the elongated stringed arrangement 2 comprises a first string device 5 and a second string device 7 both in the form of electrically amplified bass guitars. However, in another embodiment the first string device 5 and/or the second string device 7 could be an electrically amplified classical guitar, a tenor guitar, a twelve-string guitar or another form of guitar, or comprise a mix of guitar and bass strings.

In this embodiment each string device 5, 7 comprise a separate board 26 on which means for fixating the strings 6, 8—in the form of bridges 27—are arranged in either ends of the string devices 5, 7 so that the set of strings 6, 8 extends substantially the entire length of the string devices 5, 7.

In this embodiment the boards 26 of the two string devices 5, 7 are arranged side by side so that they are abutting, enabling that a musician can play both string devices 5, 7 at the same time.

In another embodiment the boards 26 of the two string devices 5, 7 could be formed as a single monolithic board e.g. to provide better stability when playing the strings 9 of either string device 5, 7 on a single board.

Also in another embodiment the two stringed devices 5, 7 could be separated by vibration damping means such as a rubber lining, a metal rail or another device suited for damping the vibrations and/or prevent vibrations from traveling from one string device 5, 7 to the other.

In this embodiment the neighboring sides of the first string device 5 and the second string device 7 are sloping, making the two string devices 5, 7 wider at one end. This is advantageous in that it enables that the strings 6, 8 may be spread further apart at the end where they are stroked—thus increasing the chance of hitting the right string while playing. However, in another embodiment of the first string device 5 and/or the second string device 7 could be provided with another shape such as rectangular, curved, triangular or another more or less complex shape.

In this embodiment the first string device 5 is provided with frets 19 in substantially the entire length of the first string device 5 while no frets 19 are provided on the second string device 7. However, in another embodiment the second string device 7 could also or instead comprise frets 19 substantially in the entire length of the string device 7, both string devices 5, 7 could be formed without frets 19 or one or both string devices 5, 7 could only be provided with frets 19 in only parts of the length of the string devices 5, 7. The distribution of frets 19 on one or both string devices 5, 7 enables that a great variety of string devices 5, 7 can be formed depending on how the stringed arrangement 2 is orientated—i.e. which string device 5, 7 is lower—and different fretted and non-fretted parts may be played simultaneous.

In this embodiment the first string device 5 comprises a single first amplifying means 10 arranged at a first end 3 of the stringed arrangement 2 and the second string device 7 comprises a single second amplifying means 11 arranged at the second end 4 of the stringed arrangement 2. However, in another embodiment the first string device 5 and/or the second string device 7 could comprise more than one amplifying means 10, 11 and/or the amplifying means 10, 11 could be located differently on the string devices 5, 7.

In this embodiment the first end 3 is the first half of the stringed arrangement 2 and the second end 4 is the other half of the stringed arrangement 2.

In this embodiment first set of strings 6 of the first string device 5 and second set of strings 8 of the second string device 7 each comprises five strings 9. However, in another embodiment one or both of the two string devices 5, 7 could comprise number of strings 9 such as four, three or less strings or six, seven eight or more strings 9.

In this embodiment the first set of strings 6 and the second set of strings 8 are at one end (the wide end in this case) connected to the bridges 27 through tuning keys 22 enabling that the tension of each string 9 can be individually adjusted.

In this embodiment each string device 5, 7 is in the end opposite the tuning keys 22 provided with three sound adjusting means 23. In this embodiment these sound adjusting means 23 are potentiometers arranged to adjust bass, treble and volume of the respective string device 5, 7 but in another embodiment the string devices 5, 7 would comprise no sound adjusting means 23, the string devices 5, 7 would comprise another number of sound adjusting means 23, the functions of one or more of the sound adjusting means 23 could be different and/or one or more of the sound adjusting means 23 could be located different on the stringed instrument 1, for example in the same end as the tuning keys, or on the body.

Figure 2:
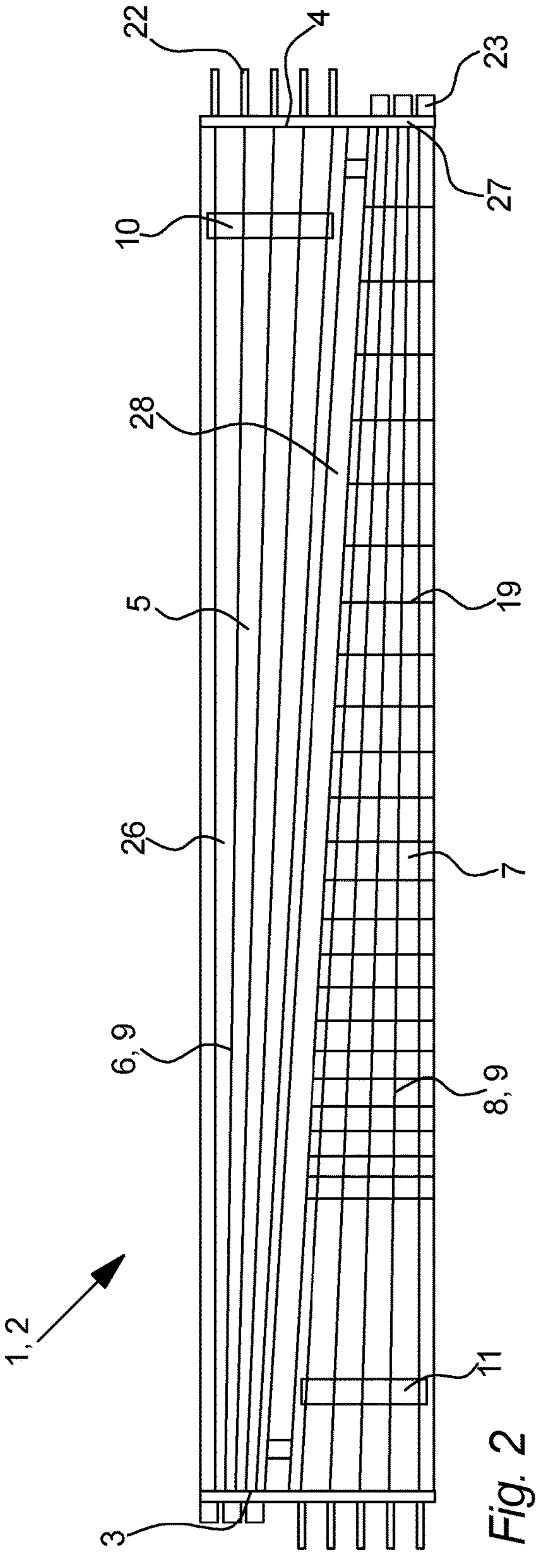
FIG. 2 illustrates a elongated stringed arrangement provided with free space between the two string devices, as seen from the front.

FIG. 2 illustrates an elongated stringed arrangement 2 provided with free space 28 between the two string devices 5, 7, as seen from the front.

In this embodiment the first string device 5 and the second string device 7 are separated by a gap—i.e. the free space 28—enabling the musician to press or tap strings with the thumb of the hand grasping the neck.

Figure 3:
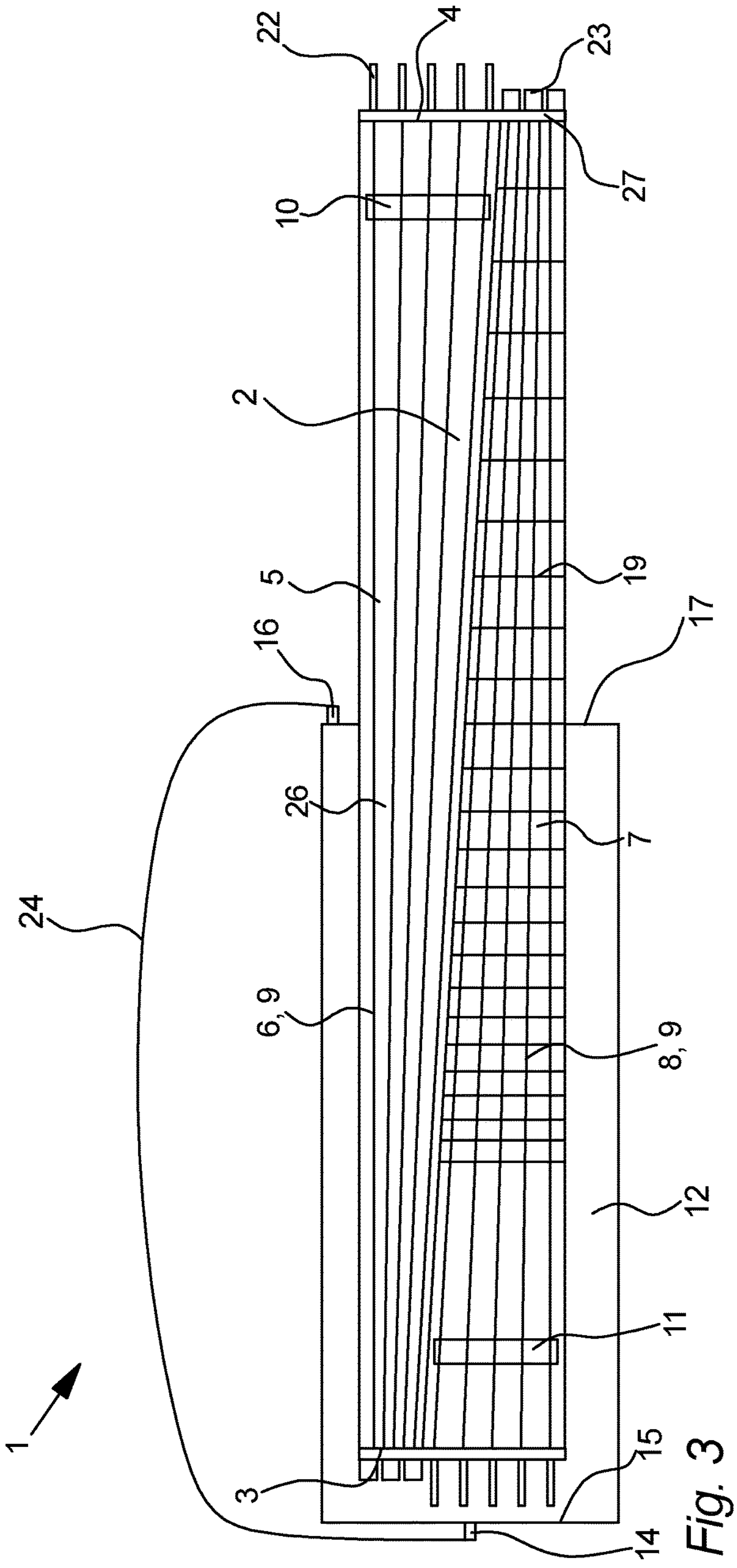
FIG. 3 illustrates a stringed arrangement mounted on a body, as seen from the front.

FIG. 3 illustrates a stringed arrangement 2 mounted on a body 12, as seen from the front.

In the embodiment the body 12 is shaped as a simple rectangle. However in another embodiment the body 12 could be formed as a square, a triangle or with a more complex shape e.g. the standard shape of a guitar body or any other kind of shape.

In this embodiment the body 12 comprises a first strap fastening means 14 arranged at the first body end 15—i.e. the end opposite the stringed arrangement 2—and a second strap fastening means 16 arranged at a second body end 17 of the elongated body 12—i.e. the end at the stringed arrangement 2.

In this embodiment the two strap fastening means 14, 16 are used for connecting a strap 24 to the body 12, enabling a musician to carry the electrically amplified stringed instrument 1 by resting the strap 24 on the shoulder of the musician, while playing the instrument.

In this embodiment the body 12 is substantially positioned at one end of the elongated stringed arrangement 2 enabling the musician to play the electrically amplified stringed instrument 1 like a traditional bass. However, in another embodiment the elongated stringed arrangement 2 could be arranged in the middle of the body 12 or at a different location of the body 12 enabling a different playing position.

In this embodiment the body 12 and the boards 26 of the stringed devices 5, 7 are substantially entirely made from wood. However, in another embodiment the body 12 and/or the boards 26 could instead or also be formed by a plastic material, a composite material, metal or other material suited for forming components of a stringed instrument 1 or any combination thereof.

Figure 4:
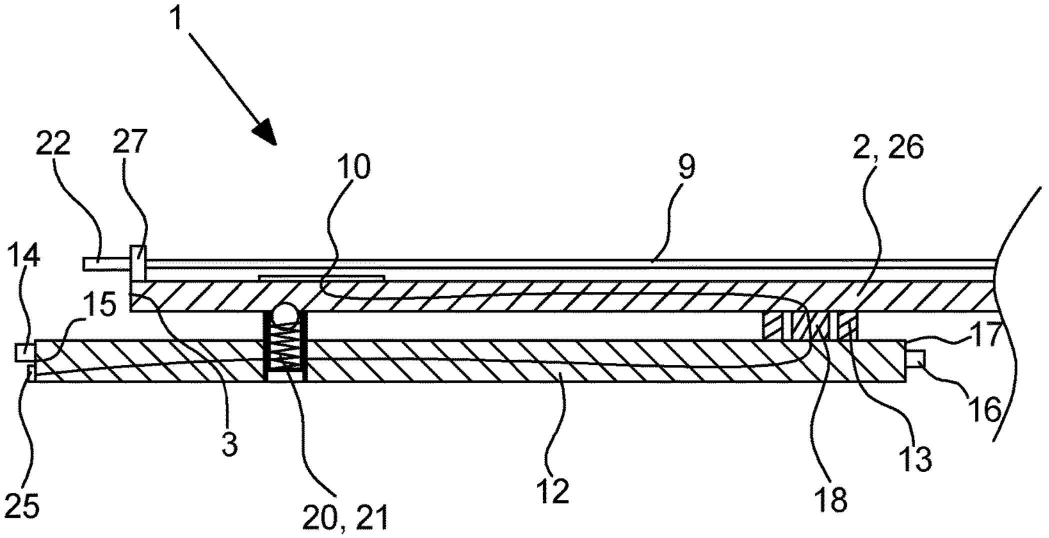
FIG. 4 illustrates a cross section through the middle of a stringed instrument, as seen from the bottom.

FIG. 4 illustrates a cross section through the middle of a stringed instrument 1, as seen from the bottom.

In this embodiment the body 12 and elongated stringed arrangement 2 are connected by means of a pivotal joint 13 enabling that the stringed arrangement 2 may be rotated at least 180° back and forth in relation to the body 12—while the body 12 can remain stationary in relation to the user of the stringed instrument 1.

In this embodiment the pivotal joint 13 is formed by mutually engaging metal parts but in another embodiment the pivotal joint 13 could comprise a ball bearing, a journal bearing or other enabling the rotation of the stringed arrangement 2.

In this embodiment the electrical signals generated by the amplifying means 10, 11 are transmitted to an output plug 25 located on the stationary body 12. This means that the electrical signals should preferably be transmitted through the pivotal joint 13. Thus, in this embodiment the pivotal joint 13 comprises conducting means 18 arranged to conduct the electrical signals by means of a slip ring arrangement but in another embodiment of the invention the signals could be conducted by means of other means known in the art capable of conducting electrical signals through a rotating joint. Or in another embodiment one or more output plugs 25 could be arranged directly on the stringed arrangement 2, the electrical signals could be conducted from the stringed arrangement 2 to the body 12 by means of cables or the electrical signals could be wirelessly transmitted to a receiver integrated with the body 12 or to a receiver external to the stringed instrument 1.

In this embodiment the stringed instrument 1 is provided with fixation means 20 enabling that the stringed arrangement 2 is maintained in the correct position in relation to the body 12 when the stringed arrangement 2 is not rotated. In this embodiment the fixation means 20 comprise a ball plunger 21 arranged in the body 12 so that the ball of the ball plunger 21 engages a corresponding depression in the backside of the stringed arrangement 2 when the stringed arrangement 2 is correctly orientated in relation to the body 12.

However, in another embodiment the fixation means 20 could be formed in a number of other ways, such as a plug arranged to engage corresponding holes, dedicated fittings, a bolt, screws or any other way enabling that the stringed arrangement 2 may be rotatably fixed in relation the body either in predefined positions or stepless.

Figure 5:
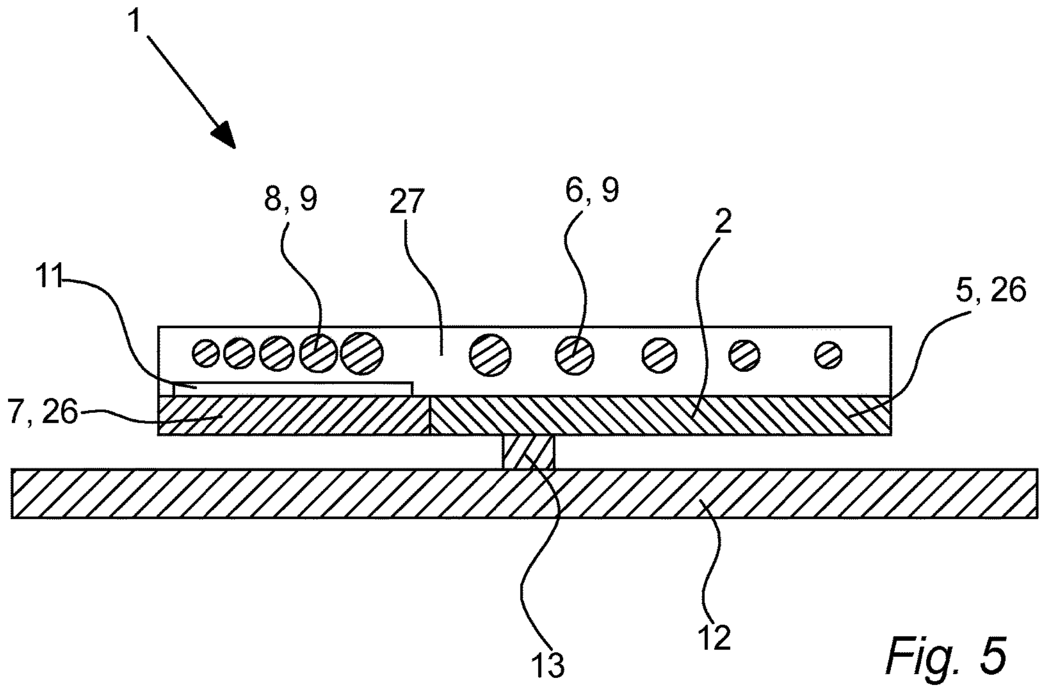
FIG. 5 illustrates a cross section through the body and the stringed arrangement, as seen from the side.

FIG. 5 illustrates a cross section through the body 12 and the stringed arrangement 12, as seen from the side.

In this embodiment the cross section of all the strings 9 of the first set of strings 6 increases towards the second string device 7 and the cross section of all the strings 9 of the second set of strings 8 increases towards the first string device 5. However, in another embodiment the cross sectional size of only some of the strings 9 of the first set of strings 6 and/or only some of the strings 9 of the second string device 7 increases towards the other string device 5, 7, respectively.

The invention has been exemplified above with reference to specific examples of stringed instrument 1, stringed arrangements 2, string devices 5, 7, amplifying means 10, 11 and other. However, it should be understood that the invention is not limited to the particular examples described above but may be designed and altered in a multitude of varieties within the scope of the invention as specified in the claims.

The invention claimed is:

1. An electrically amplified stringed instrument comprising an elongated stringed arrangement including a first end and a second end, wherein said stringed arrangement further comprises a first string device including a first set of strings extending between said first end and said second end of said stringed arrangement and a second string device including a second set of strings extending between said first end and said second end of said stringed arrangement, wherein said first string device and said second string device are arranged substantially side by side so that a cross section of at least some of the strings of said first set of strings increases towards said second string device and so that a cross section of at least some of said strings of said second set of strings increases towards said first string device, wherein said first string device comprises at least one first amplifying means arranged at said first end of said elongated stringed arrangement and said second string device comprises at least one second amplifying means arranged at said second end of said elongated stringed arrangement, wherein said stringed arrangement is mounted on a body, and wherein said stringed arrangement is connected to said body through a pivotal joint.

2. The electrically amplified stringed instrument according to claim 1, wherein said pivotal joint is arranged substantially approximately in a middle between said first end and said second end of said elongated stringed arrangement.

3. The electrically amplified stringed instrument according to claim 1, wherein said body is elongated substantially in the direction of said first set of strings and said second set of strings during use of said stringed instrument and wherein said body comprises a first strap fastening means arranged at a first body end of said elongated body and a second strap fastening means arranged at a second body end of said elongated body.

4. The electrically amplified stringed instrument according to claim 1, wherein said first amplifying means and said second amplifying means are arranged to generate an electrical signal in accordance with vibrations of said first set of strings and said second set of strings respectively, wherein said pivotal joint comprises conducting means for conducting said electrical signals through said pivotal joint.

5. The electrically amplified stringed instrument according to claim 1, wherein at least one of said first string device and second string device comprises frets.

6. The electrically amplified stringed instrument according to claim 5, wherein only one of said first string device and said second string device comprises frets.

7. The electrically amplified stringed instrument according to claim 1, wherein said stringed instrument comprises fixation means for fixating said body and said elongated stringed arrangement in relation to mutual rotation during use of said stringed instrument.

8. The electrically amplified stringed instrument according to claim 7, wherein said fixation means comprise a ball plunger.

9. The electrically amplified stringed instrument according to claim 1, wherein said first string device and said second string device are arranged to extend substantially in the same plane.

10. The electrically amplified stringed instrument according to claim 1, wherein free space is provided between said first string device and said second string device.

11. An electrically amplified stringed instrument comprising an elongated stringed arrangement including a first end and a second end, wherein said stringed arrangement further comprises a first string device including a first set of strings extending between said first end and said second end of said stringed arrangement and a second string device including a second set of strings extending between said first end and said second end of said stringed arrangement, wherein said first string device and said second string device are arranged substantially side by side so that a cross section of at least some of the strings of said first set of strings increases towards said second string device and so that a cross section of at least some of said strings of said second set of strings increases towards said first string device, wherein said first string device comprises at least one first amplifying means arranged at said first end of said elongated stringed arrangement and said second string device comprises at least one second amplifying means arranged at said second end of said elongated stringed arrangement.

12. The electrically amplified stringed instrument according to claim 11, wherein said stringed arrangement is mounted on a body.

13. The electrically amplified stringed instrument according to claim 12, wherein said stringed arrangement is connected to said body through a pivotal joint.

14. The electrically amplified stringed instrument according to claim 13, wherein said pivotal joint is arranged approximately in a middle between said first end and said second end of said elongated stringed arrangement.

15. The electrically amplified stringed instrument according to claim 12, wherein said body is elongated substantially in the direction of said first set of strings and said second set of strings during use of said stringed instrument and wherein said body comprises a first strap fastening means arranged at a first body end of said elongated body and a second strap fastening means arranged at a second body end of said elongated body.

16. The electrically amplified stringed instrument according to claim 13, wherein said first amplifying means and said second amplifying means are arranged to generate an electrical signal in accordance with vibrations of said first set of strings and said second set of strings respectively, wherein said pivotal joint comprises conducting means for conducting said electrical signals through said pivotal joint.

17. The electrically amplified stringed instrument according to claim 12, wherein said stringed instrument comprises fixation means for fixating said body and said elongated stringed arrangement in relation to mutual rotation during use of said stringed instrument.

18. The electrically amplified stringed instrument according to claim 17, wherein said fixation means comprise a ball plunger.

19. The electrically amplified stringed instrument according to claim 11, wherein said first string device and said second string device are arranged to extend substantially in the same plane.

20. The electrically amplified stringed instrument according to claim 11, wherein free space is provided between said first string device and said second string device.

* * * * *